M. S. BETTICE.
Sod-Cutter.
No. 225,324.          Patented Mar. 9, 1880.
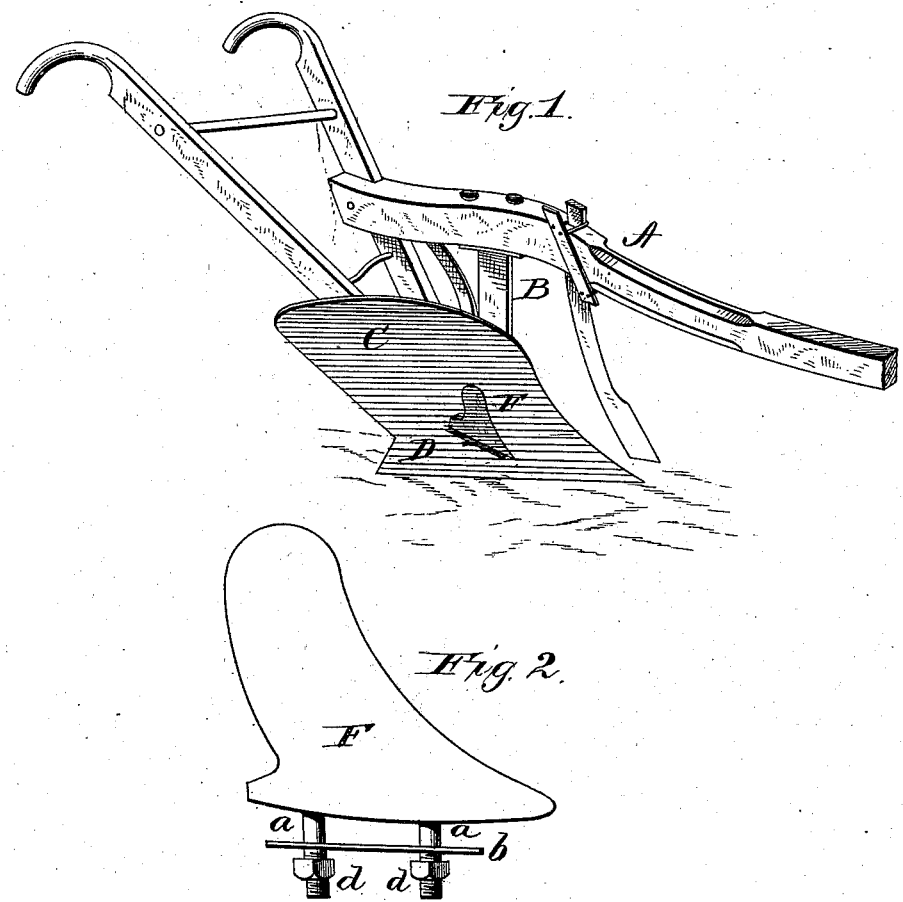

UNITED STATES PATENT OFFICE.

MYERS S. BETTICE, OF ATTICA, INDIANA.

SOD-CUTTER.

SPECIFICATION forming part of Letters Patent No. 225,324, dated March 9, 1880.

Application filed December 11, 1879.

*To all whom it may concern:*

Be it known that I, MYERS S. BETTICE, of Attica, in the county of Fountain, and in the State of Indiana, have invented certain new and useful Improvements in Sod-Cutters; and I do hereby declare that the following is a full, clear, and exact description thereof, reference being had to the accompanying drawings, and to the letters of reference marked thereon, making a part of this specification.

The nature of my invention consists in a sod-cutter attachment to plows, as will be hereinafter more fully set forth.

In order to enable others skilled in the art to which my invention appertains to make and use the same, I will now proceed to describe its construction and operation, referring to the annexed drawings, in which—

Figure 1 is a perspective view of a plow embodying my invention. Fig. 2 is a side view of the sod-cutter separate from the plow.

A represents a plow-beam, with standard B, mold-board C, and share D. F represents the sod-cutter, made substantially in the form shown, and provided on its under edge with two projecting threaded pins or bolts, a a. This cutter is to be attached on the plowshare half-way from the point of the outward point of the share. The two pins or prongs a a go through two holes, one in the share and one in the lower part of the mold-board. A plate or bar, b, is then placed on the ends of the prongs on the under side of the share and lower part of mold-board, and nuts d d then screwed on the ends of the prongs for holding the cutter to the plow and at the same time strengthening the share.

When the cutter is attached its point will run down within three-quarters of an inch of the edge of the share.

The object of this cutter is to split the sod in two pieces as it runs up from the share.

I am aware that removable sod-cutters have been attached to plows, and I do not claim such, broadly, as my invention.

Having thus fully described my invention, what I claim as new, and desire to secure by Letters Patent, is—

In combination with the share and mold-board of a plow, the sod-cutter F, provided with two threaded pins or prongs, a a, one passing through the share and the other through the mold-board, the plate or bar b, and nuts d d, substantially as and for the purposes herein set forth.

In testimony that I claim the foregoing I have hereunto set my hand this 28th day of November, 1879.

MYERS S. BETTICE.

Witnesses:
WILLIAM FOX,
SUE S. MOSIER.